US011950157B2

(12) United States Patent
Zhang et al.

(10) Patent No.: US 11,950,157 B2
(45) Date of Patent: Apr. 2, 2024

(54) MOBILITY AND LOAD BALANCING TARGET SELECTION FOR UNLICENSED CARRIERS

(71) Applicant: Telefonaktiebolaget LM Ericsson (publ), Stockholm (SE)

(72) Inventors: Chunhui Zhang, Stockholm (SE); Peter Alriksson, Horby (SE); Tomas Hedberg, Nacka (SE); Yusheng Liu, Lund (SE); Mai-Anh Phan, Herzogenrath (DE); David Sugirtharaj, Lund (SE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

(21) Appl. No.: 16/481,825

(22) PCT Filed: Jan. 30, 2018

(86) PCT No.: PCT/EP2018/052309
§ 371 (c)(1),
(2) Date: Jul. 29, 2019

(87) PCT Pub. No.: WO2018/141754
PCT Pub. Date: Aug. 9, 2018

(65) Prior Publication Data
US 2020/0059841 A1    Feb. 20, 2020

Related U.S. Application Data

(60) Provisional application No. 62/454,162, filed on Feb. 3, 2017.

(51) Int. Cl.
H04W 36/22    (2009.01)
H04W 16/14    (2009.01)
(Continued)

(52) U.S. Cl.
CPC .......... *H04W 36/22* (2013.01); *H04W 16/14* (2013.01); *H04W 36/0085* (2018.08); *H04W 36/08* (2013.01)

(58) Field of Classification Search
CPC . H04W 36/22; H04W 36/0085; H04W 16/14; H04W 36/08; H04W 76/15; H04L 27/0006; H04L 5/001
See application file for complete search history.

(56) References Cited

U.S. PATENT DOCUMENTS 8,446,899 B2 *  5/2013  Lei ..................... H04L 65/1069
                                                   370/352
9,516,549 B1   12/2016  Aksu
(Continued)

FOREIGN PATENT DOCUMENTS

CN    105101224 A    11/2015
CN    105794139 A    7/2016
(Continued)

OTHER PUBLICATIONS

PCT International Search Report, dated Apr. 12, 2018, in connection with International Application No. PCT/EP2018/052309, all pages.
(Continued)

*Primary Examiner* — Nishant Divecha
(74) *Attorney, Agent, or Firm* — Sage Patent Group

(57) ABSTRACT

Methods, nodes and computer program products control radio channel deployment when using un-licensed carriers in a wireless communication network and control mobility and/or load balancing target selection when using un-licensed carriers. When performed in an access node, unlicensed carrier intrinsic cell channel load is determined in a cell served by the access node based on one or more predetermined channel load indicators and neighbor cell channel load information is obtained, from one or more neighboring access nodes. The neighbor cell channel load
(Continued)

information includes unlicensed carrier channel load in respective cells based on the one or more predetermined channel load indicators. At least one channel deployment operation is initiated based on an outcome of one or more comparative operations including the determined unlicensed carrier intrinsic cell channel load and/or the obtained neighbor cell channel load information.

33 Claims, 8 Drawing Sheets

(51) Int. Cl.
  *H04W 36/00* (2009.01)
  *H04W 36/08* (2009.01)

(56) References Cited

U.S. PATENT DOCUMENTS

| | | | | |
|---|---|---|---|---|
| 9,521,583 | B2* | 12/2016 | Tian | H04W 72/0486 |
| 9,693,262 | B2* | 6/2017 | Gunnarsson | H04W 24/10 |
| 9,820,188 | B2* | 11/2017 | Ekemark | H04W 28/08 |
| 10,098,003 | B2* | 10/2018 | Li | H04B 1/713 |
| 10,212,636 | B2* | 2/2019 | Damnjanovic | H04W 36/30 |
| 2010/0317315 | A1* | 12/2010 | Burbidge | H04W 36/0022 455/404.1 |
| 2013/0322279 | A1* | 12/2013 | Chincholi | H04W 76/27 370/252 |
| 2014/0094185 | A1* | 4/2014 | Yiu | H04W 36/22 455/453 |
| 2014/0295843 | A1* | 10/2014 | Van Der Velde | H04W 36/22 455/436 |
| 2015/0043486 | A1* | 2/2015 | Ozturk | H04W 28/08 370/329 |
| 2015/0103657 | A1* | 4/2015 | Henderson | H04W 28/0284 370/232 |
| 2015/0126207 | A1 | 5/2015 | Li et al. | |
| 2015/0208411 | A1* | 7/2015 | Mochizuki | H04W 72/0453 455/452.1 |
| 2015/0223115 | A1 | 8/2015 | Liang et al. | |
| 2015/0257051 | A1* | 9/2015 | Rao | H04W 36/0066 455/439 |
| 2016/0174095 | A1 | 6/2016 | Damnjanovic et al. | |
| 2016/0249264 | A1* | 8/2016 | Axen | H04W 36/04 |
| 2016/0338118 | A1* | 11/2016 | Vajapeyam | H04W 40/244 |
| 2017/0135009 | A1* | 5/2017 | Ling | H04L 1/0023 |
| 2017/0222774 | A1* | 8/2017 | Hu | H04L 5/0037 |
| 2019/0357057 | A1* | 11/2019 | Cirkic | H04W 24/10 |

FOREIGN PATENT DOCUMENTS

| | | |
|---|---|---|
| KR | 1020150139825 A | 12/2015 |
| WO | 2016094173 A1 | 6/2016 |

OTHER PUBLICATIONS

PCT Written Opinion, dated Apr. 12, 2018, in connection with International Application No. PCT/EP2018/052309, all pages.
Korean Office Action dated Jun. 9, 2020 in connection with Korean Application No. 10-2019-7022560, 9 pages.
English language translations of Korean Office Action dated Jun. 9, 2020 in connection with Korean Application No. 10-2019-7022560, 8 pages.
Huawei, Hisilicon, 3GPP TSG RAN WG1 Meeting #82bis, R1-155068, Malmo, Sweden, Oct. 5-9, 2015, "UE support of carrier selection of LAA", 7 pages.
India Examination Report dated May 27, 2021 in connection with India Application No. 201947030684, 6 pages.
Chinese Office Action dated Jul. 2, 2021, in connection with Chinese Application No. 201880009899.X, 11 pages.

* cited by examiner

MOBILITY AND LOAD BALANCING TARGET SELECTION FOR UNLICENSED CARRIERS

CROSS-REFERENCE TO RELATED APPLICATIONS

This application is a 371 national stage application of PCT/EP2018/052309, filed Jan. 30, 2018, which claims the benefit of U.S. Provisional Application No. 62/454,162, filed Feb. 3, 2017, which are both hereby incorporated herein by reference in their entireties.

TECHNICAL FIELD

The present disclosure relates to methods, nodes and computer program products for controlling radio channel deployment when using un-licensed carriers in a wireless communication network. In particular, the present disclosure relates to method for mobility and/or load balancing target selection when using un-licensed carriers.

BACKGROUND

In earlier days, the spectrum used by LTE was dedicated, i.e., licensed, to LTE. This had the advantage that LTE system did not need to consider coexistence as an aspect relevant for spectrum efficiency. With the ever increasing need for increased throughput in wireless communication networks, the licensed spectrum will not be sufficient to meet current and future demands. Therefore, LTE operation in a combination of licensed spectrum and un-licensed spectrum is now being considered; "Licensed Assisted Access" or LAA is proposed as a technology for coexistence on unlicensed carriers with, e.g., Wi-Fi. LAA intends to allow Long Term Evolution, LTE, equipment to also operate in the unlicensed radio spectrum as a complement to the licensed spectrum. Candidate bands for LTE operation in the unlicensed spectrum include 5 GHz, 3.5 GHz, etc. Accordingly, the unlicensed spectrum is used as a complement to the licensed spectrum or allows standalone operation.

For the case of unlicensed spectrum used as a complement to the licensed spectrum, devices connect in the licensed spectrum. The LAA solution allows an access node, e.g., an eNodeB to use and configure a secondary cell, SCell, on an LAA carrier in the unlicensed band. A primary cell, PCell, in the licensed band will be used to carry the more critical real time traffic and control information while the LAA carrier will be used to increase the capacity for less sensitive data, e.g., best effort. Thus, devices connect in the licensed spectrum (primary cell or PCell) and use carrier aggregation to benefit from additional transmission capacity in the unlicensed spectrum (secondary cell or SCell). The carrier aggregation, CA, framework allows to aggregate two or more carriers with the condition that at least one carrier (or frequency channel) is in the licensed spectrum and at least one carrier is in the unlicensed spectrum.

In addition to LAA operation, scenarios where LTE is fully run on the unlicensed band without the support from the licensed band are considered. This is called LTE-U Stand Alone. In the standalone (or completely unlicensed spectrum) mode of operation, one or more carriers are selected solely in the unlicensed spectrum. Also, the 3GPP New Radio, NR, system is also expected to operate in unlicensed spectrum, both in a "licensed assisted access" fashion and stand alone.

Prior to initiating transmissions in the unlicensed spectrum, regulatory requirements and/or spectrum efficiency considerations may require that some type of channel sensing is performed since the unlicensed spectrum is shared with other radio technologies, e.g., Wi-Fi. Furthermore, there may be imposed requirements relating to transmission power limitations or maximum channel occupancy time. Since the unlicensed spectrum must be shared with other devices or nodes of similar or dissimilar wireless technologies, a so-called Listen-Before-Talk, LBT, operation may need to be applied prior to transmission on a channel that uses unlicensed spectrum. This also applies to LTE node transmissions in the un-licensed spectrum. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink, UL; performance is especially hampered. UL transmission is becoming more and more important with user-centric applications and the need for pushing data to cloud.

As an example, the unlicensed 5 GHz spectrum could be considered. The 5 GHz is mainly used by equipment implementing the IEEE 802.11 Wireless Local Area Network, WLAN, standard known commercially as Wi-Fi. This standard allows completely standalone operation in the unlicensed spectrum. Unlike the case in LTE, Wi-Fi terminals can asynchronously access the medium and thus show better uplink, UL, performance characteristics especially in congested network conditions.

LTE uses OFDM in the downlink and DFT-spread OFDM (also referred to as single-carrier FDMA) in the uplink. The basic LTE downlink physical resource can thus be seen as a time-frequency grid as illustrated in FIG. 2a, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length $T_{subframe}=1$ ms as shown in FIG. 2b. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g., the control information.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals, DMRS, and sounding reference signals, SRS. DMRS are used for coherent demodulation of PUSCH and PUCCH data, whereas SRS is not associated with any data or control information but is generally used to estimate the uplink channel quality for purposes of frequency-selective scheduling.

Unlicensed bands offer the possibility for deployment of radio networks by non-traditional operators that do not have access to licensed spectrum, such as e.g., building owners, industrial site and municipalities who want to offer a service within an operation that they control. Recently the LTE standard has been evolved to operate in unlicensed bands for the sake of providing mobile broadband using unlicensed spectrum. As mentioned above, 3GPP based features of License Assisted Access, LAA, are considered. Such features were introduced in Rel. 13 supporting carrier aggregation between a primary carrier in licensed bands, and one or several secondary carriers in unlicensed bands. Further evolution of the LAA feature, which only supports DL traffic, was specified within the Rel. 14 feature of enhanced Licenses Assisted Access, eLAA, which added the possibility to also schedule uplink traffic on the secondary carriers. In parallel to the above mentioned work within 3GPP Rel. 14, work within the MulteFire Alliance, MFA, aimed to standardize a system that would allow the use of standalone primary carriers within unlicensed spectrum. The MulteFire 1.0 standard supports both UL and DL traffic.

The concept of Mobility Load Balancing, MLB, aims to increase the overall capacity in an LTE network and achieve an evenly distributed load among the cells. The load balancing function transfers part of the traffic from congested cells by exchanging load information, e.g., resource status information between eNBs and/or access nodes, and subsequently trigger handover or adjusting configurations for handover and/or reselection.

The resource status information exchanged between the eNBs consists of downlink and uplink usage of physical resource blocks, PRBs. This exchange of information is based on characteristics from the licensed spectrum, where cells have continuous access to the frequency channel.

In unlicensed spectrum, the frequency channel may be shared by multiple communication systems that may operate with the same or different Radio Access Technologies, RATs. One problem with existing techniques for exchange of load balancing information is that the channel load for a cell includes not only the usage of the physical resources for the cell and its served wireless devices, but also occupancy from each neighboring node sharing the same frequency channel—which would not be visible in a report on usage of physical resources for the cell. Consequently, a current resource status report may be misleading for a cell or access node that appears to have low traffic load within the cell but that suffers from strong interference on the neighboring access nodes sharing the same frequency channel.

The risk of misleading results from exchange of resource status information increases with traffic load and the number of contending nodes in the network. Consequently, there is a need for a configurable, non-opportunistic solution to the problem of controlling load balancing and radio channel deployment when using an un-licensed spectrum.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above-identified deficiencies in the art or other disadvantages. In particular, the present disclosure addresses the problem of accurately determining channel load for mobility and load balancing target selection.

According to a first aspect, this object is achieved by a method performed in an access node, for controlling radio channel deployment in an un-licensed spectrum, the method comprising to determine unlicensed carrier intrinsic cell channel load in a cell served by the access node based on one or more predetermined channel load indicators and to obtain neighbor cell channel load information, from one or more neighboring access nodes, the neighbor cell channel load information comprising unlicensed carrier channel load in respective cells based on the one or more predetermined channel load indicators. Based on an outcome of one or more comparative operations comprising the determined unlicensed carrier intrinsic cell channel load and/or the obtained neighbor cell channel load, at least one channel deployment operation is initiated.

According to embodiments of the disclosure, the channel deployment operation is a mobility control operation and/or a load balancing operation. Accordingly, the disclosed method provides mobility control and load balancing performance in the unlicensed spectrum.

According to embodiments of the disclosure, the channel deployment operation is a configuration of a secondary carrier; thereby providing for improved channel deployment and channel load considerations in a Licensed Assisted Access, LAA, scenario.

According to embodiments of the disclosure, neighbor cell channel load information is obtained from one or more neighboring access nodes, wherein the step of obtaining comprises to select one or more neighboring access nodes and to transmit, to the selected one or more neighboring access nodes, a request for neighbor cell channel load information. Neighbor cell channel load information, comprising unlicensed carrier channel load determined based on the one or more predetermined channel load indicators, is received in the access node.

Thus, the obtained neighbor channel load information may be retrieved from respective neighboring access node that each perform the step of determining their unlicensed carrier intrinsic cell channel load and shares this load information with the neighboring nodes so that the load values accessible within an access node will be fully comparable.

According to embodiments of the disclosure, the one or more comparative operations are performed for a weighted average of channel load indicators. This provides the advantages of a simple comparative operation wherein the intrinsic cell channel load is compared to corresponding channel load values of neighboring nodes or to predetermined thresholds values.

According to embodiments of the disclosure, the one or more comparative operations are performed for each respective channel load indicators, either as a comparison between intrinsic cell or neighboring cell values for each specific channel load indicator or as a comparison to predetermined threshold values for each specific channel load indicator. Thus, threshold related rules or comparative rules may be determined to allow further improvements to the radio channel deployment and the ability to respond also to less apparent load unbalance between neighboring cells.

According to embodiments of the disclosure, the initiating of at least one channel deployment operation comprises to select one or more neighboring access nodes for the load balancing operation or to initiate handover of at least one wireless device connection to the selected neighboring access node or to initiate connection release and redirect of at least one wireless device to the selected neighboring access node. Measurement configurations associated with the one or more neighboring access nodes may also be adjusted. Consequently, the access node is capable of effecting load based channel deployment decisions.

According to a second aspect, the above object is also achieved by a computer readable storage medium storing a computer program which, when executed in an access node, cause execution of the method according to the first aspect.

According to a third aspect, the above object is also achieved by an access node that is configured for controlling radio channel deployment in an unlicensed spectrum, the access node comprising radio circuitry arranged for wireless device communication, communications circuitry arranged for network node communication and processing circuitry arranged for performing the above method aspects. Namely, to determine unlicensed carrier intrinsic cell channel load in a cell served by the access node based on one or more predetermined channel load indicators and to obtain neighbor cell channel load information, from one or more neighboring access nodes, the neighbor cell channel load information comprising unlicensed carrier channel load in respective cells based on the one or more predetermined channel load indicators. The processing circuitry is further configured to initiate at least one channel deployment operation based on an outcome of one or more comparative operations comprising the determined carrier intrinsic cell channel load and/or the obtained neighbor cell channel load information.

According to a fourth aspect, the object of the present disclosure is also achieved by a method performed in a network node; the network node being configured for controlling radio channel deployment in an un-licensed spectrum. The method comprises to receive, from an access node, a request to determine unlicensed carrier channel load based on one or more channel load indicators and to determine unlicensed carrier channel load in a cell served by the network node based on the one or more channel load indicators. The network node is further configured to send information comprising the determined unlicensed carrier channel load to the requesting access node.

According to embodiments of the disclosure, the network node is an access node having a neighbor relationship to the requesting access node.

According to a fifth aspect, the above object is also achieved by a computer readable storage medium storing a computer program which, when executed in a network node, cause execution of the method according to the fourth aspect.

According to a sixth aspect, the above object is also achieved by a network node that is configured for controlling radio channel deployment in an unlicensed spectrum, the network node comprising communications circuitry arranged for network node communication and processing circuitry arranged for performing the above method aspects, namely to receive, from an access node, a request to determine unlicensed carrier channel load based on one or more channel load indicators, to determine unlicensed carrier channel load in a cell served by the network node based on the one or more channel load indicators and to send information comprising the determined unlicensed carrier channel load to the requesting access node.

According to a seventh aspect, the object is also achieved by a method performed in a wireless device; the wireless device being configured for controlling radio channel deployment in an un-licensed spectrum. The method comprises to receive an intrinsic cell channel load determined for an unlicensed carrier in a cell served by a serving access node; wherein the intrinsic cell channel load is determined based on one or more predetermined channel load indicators and to receive neighbor cell channel load information comprising unlicensed carrier channel load in respective neighbor cells to the cell served by the serving access node; wherein the unlicensed carrier channel load is determined based on the one or more predetermined channel load indicators. The wireless device is further configured to select a mobility target based on received intrinsic channel load and neighbor cell channel load information.

According to an eight aspect, the object is also achieved by a computer readable storage medium storing a computer program which, when executed in a wireless device, cause execution of the method according to the seventh aspect.

According to a ninth aspect, the object is achieved by a wireless device that is configured for controlling radio channel deployment in an unlicensed spectrum, the wireless device comprising radio circuitry arranged for wireless device communication and processing circuitry arranged for performing the above method aspects, namely to receive an intrinsic cell channel load determined for an unlicensed carrier in a cell served by a serving access node; wherein the intrinsic cell channel load is determined based on one or more predetermined channel load indicators and to receive neighbor cell channel load information comprising unlicensed carrier channel load in respective neighbor cells to the cell served by the serving access node; wherein the unlicensed carrier channel load is determined based on the one or more predetermined channel load indicators. The processing circuitry is further configured to select a mobility target based on the received intrinsic channel load and neighbor cell channel load information.

In some embodiments, any of the above aspects may additionally have features identical with or corresponding to any of the various features as explained above for any of the other aspects.

An advantage of some embodiments is improved radio channel deployment in the unlicensed spectrum and improved network robustness.

BRIEF DESCRIPTION OF THE DRAWINGS

The foregoing will be more readily understood from the following detailed description of example embodiments, as illustrated in the accompanying drawings in which like reference characters refer to the same parts throughout the different views. The drawings are not necessarily to scale, emphasis instead being placed upon illustrating the example embodiments.

FIG. 2 a. illustrates an LTE downlink physical resource
b. illustrates an LTE time-domain structure
c. illustrates a downlink, DL subframe, in LTE
d. illustrates an uplink, UL, subframe, in LTE;

Figure 3:
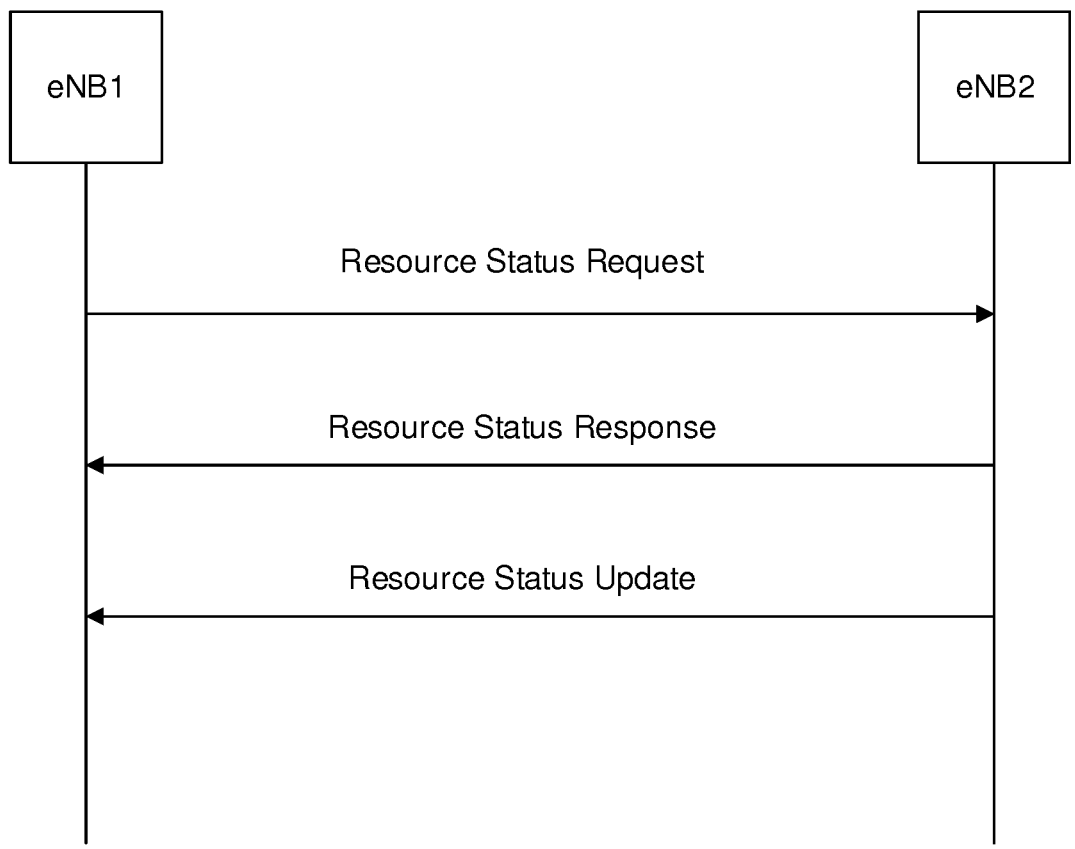

FIG. 3 illustrates load information exchange in LTE

Figure 5:
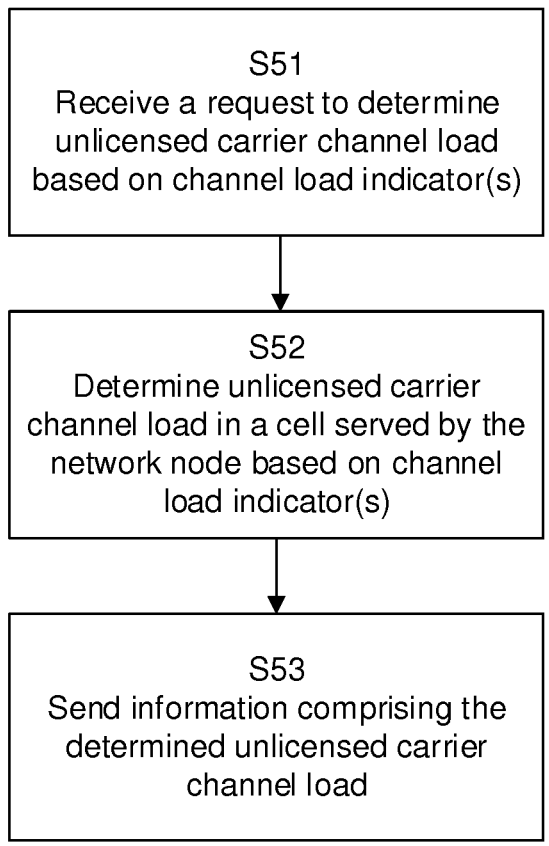
Figure 6:
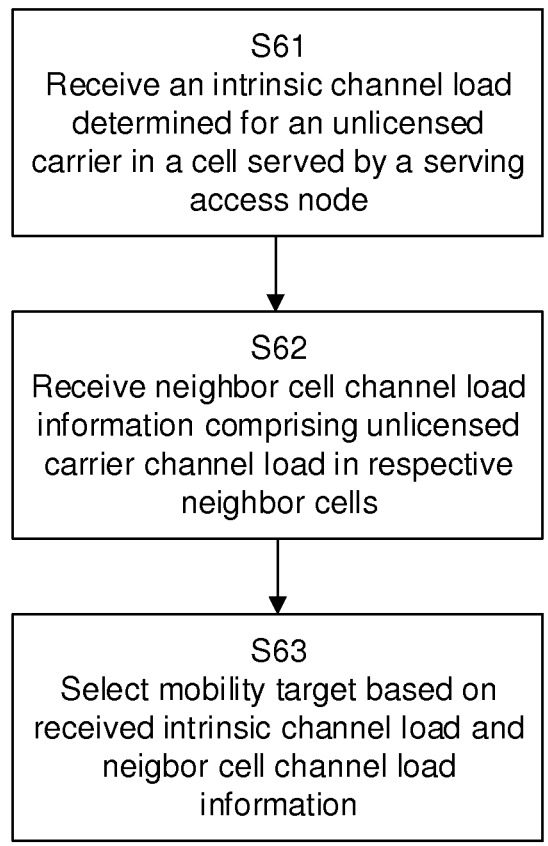
Figure 8:
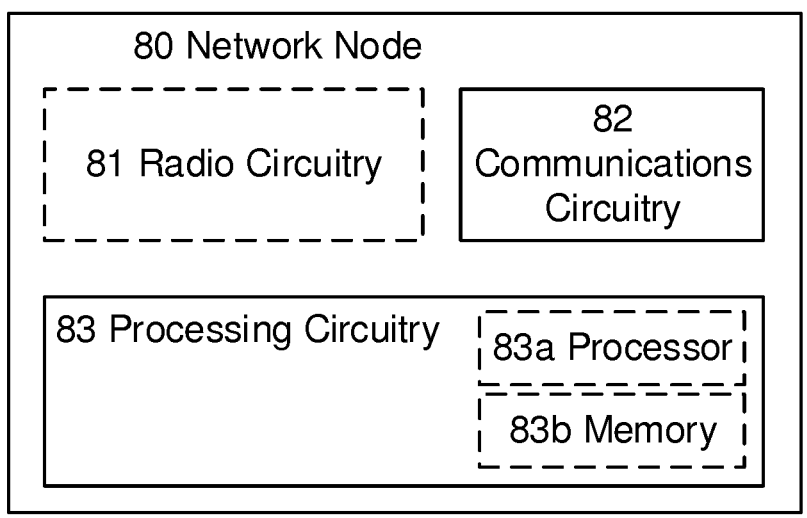
Figure 9:
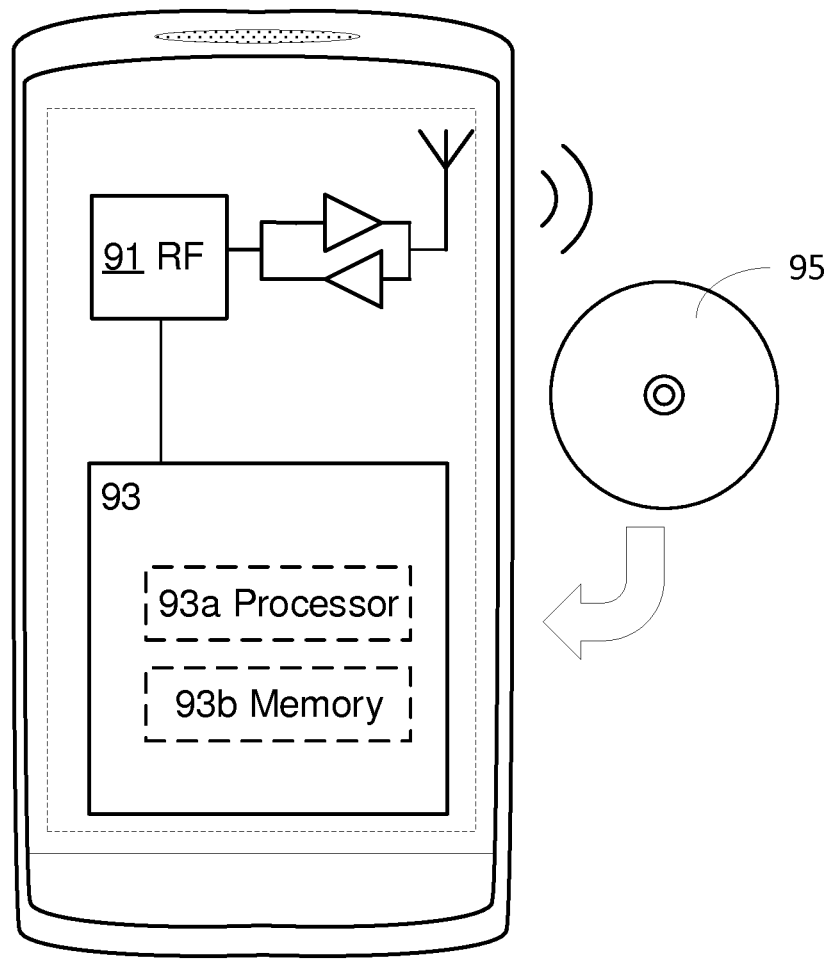

FIG. 4 a. is a flowchart illustrating exemplary method steps performed in an access node for embodiments of the disclosure;
b. is a flowchart illustrating exemplary method steps performed in an access node for embodiments of the disclosure;

FIG. 5 is a flowchart illustrating exemplary method steps performed in a network node for embodiments of the disclosure;

FIG. 6 is a flowchart illustrating exemplary method steps performed in a wireless device for embodiments of the disclosure;

FIG. 7 a. illustrates an example access node configuration;
b. illustrates an example access node configuration;

FIG. 8 illustrates an example network node configuration;

FIG. 9 illustrates an example wireless device configuration.

DETAILED DESCRIPTION

Aspects of the present disclosure will be described more fully hereinafter with reference to the accompanying drawings. The method and arrangement disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the embodiments, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

Figure 1:
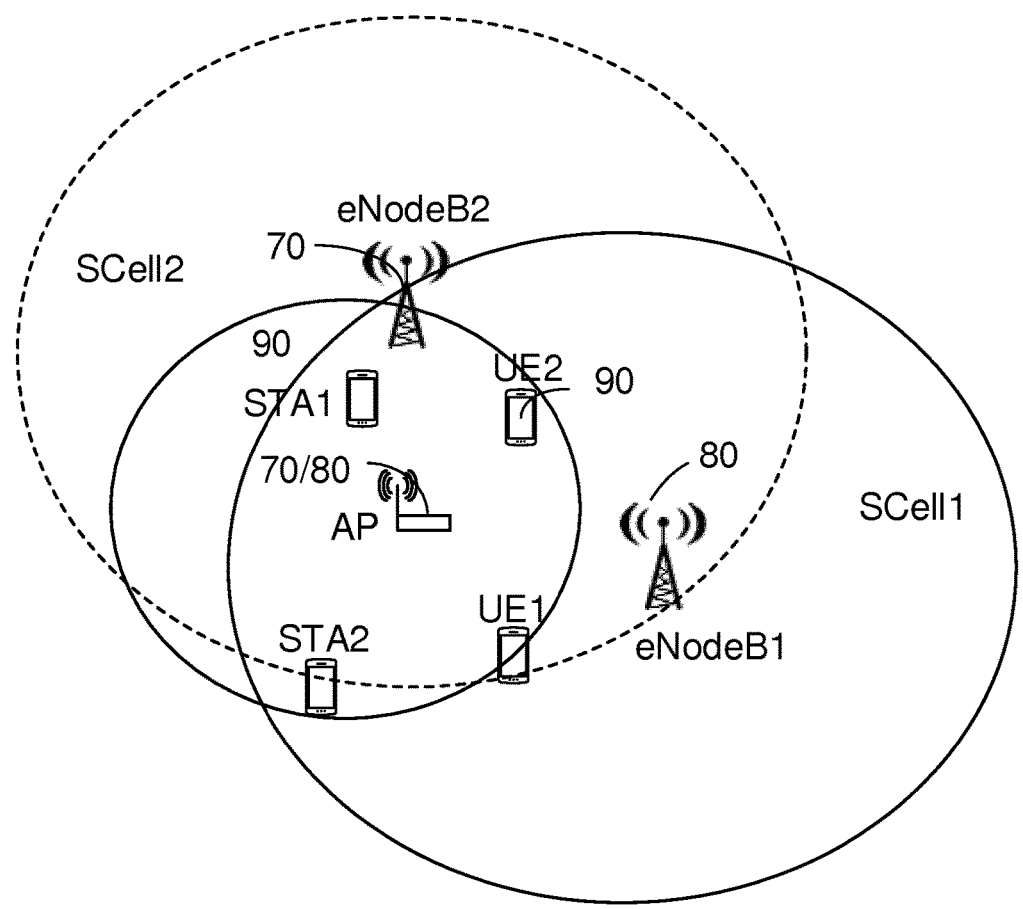
FIG. 1 discloses an overview of an LAA scenario

FIG. 1 schematically illustrates a network scenario comprising a plurality of contending radio network nodes. Two wireless devices, UE1 and UE2 belong to respective LAA SCells (SCell 1 and SCell 2) of eNodeB 1 and eNodeB 2. Two Wi-Fi operated devices, STA1 and STA2 are connected to Wi-Fi access point, AP. The disclosed scenario represents a typically network scenario where the proposed methods for control of channel deployment in the unlicensed spectrum provides significant benefits.

Figure 2A:
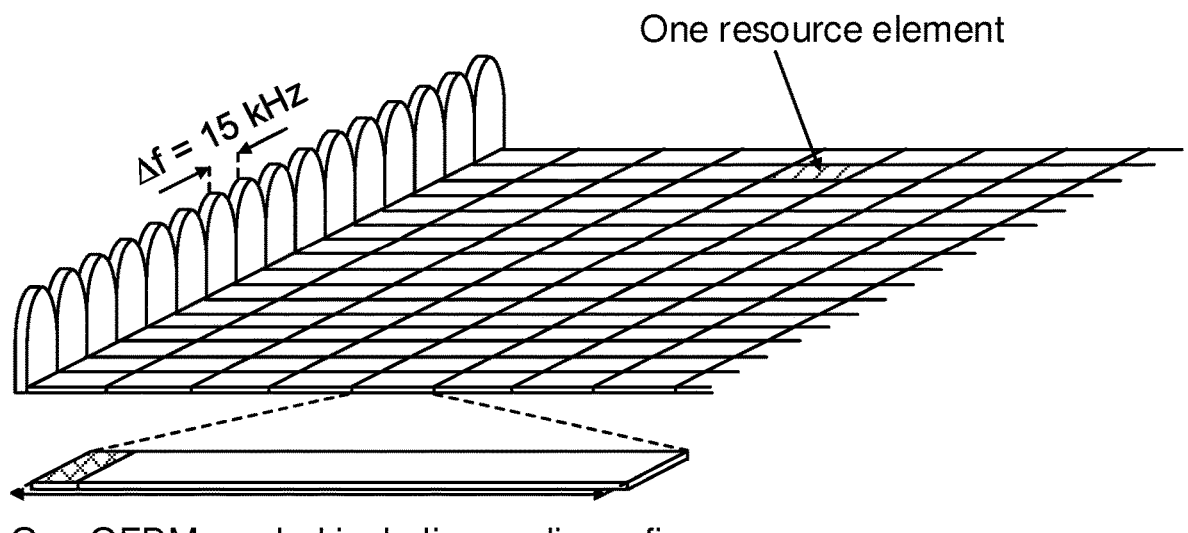

LTE uses Orthogonal Frequency Division Multiplexing, OFDM, in the downlink and discrete Fourier transform, DFT, spread OFDM (also referred to as single-carrier Frequency Division Multiple Access, FDMA, in the uplink. The basic LTE downlink physical resource can thus be seen as a time-frequency grid as illustrated in FIG. 2a, where each resource element corresponds to one OFDM subcarrier during one OFDM symbol interval. The uplink subframe has the same subcarrier spacing as the downlink and the same number of Single Carrier, SC-FDMA symbols in the time domain as OFDM symbols in the downlink.

Figure 2B:
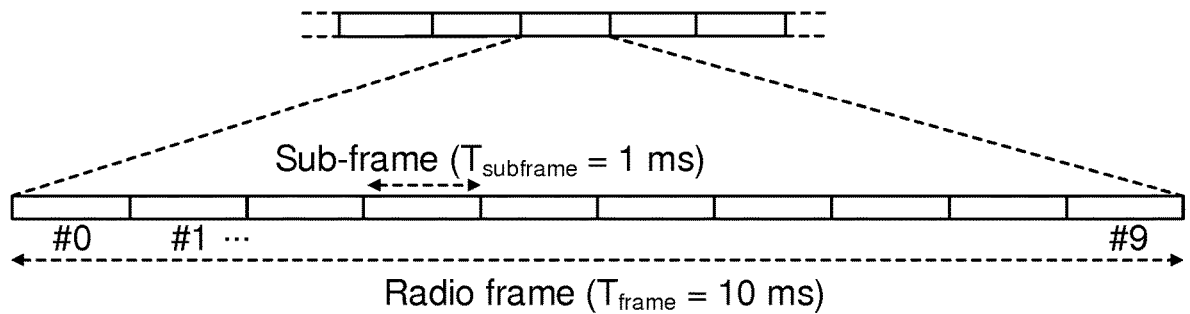

In the time domain, LTE downlink transmissions are organized into radio frames of 10 ms, each radio frame consisting of ten equally-sized subframes of length Tsubframe=1 ms as shown in FIG. 2b. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Figure 2C:
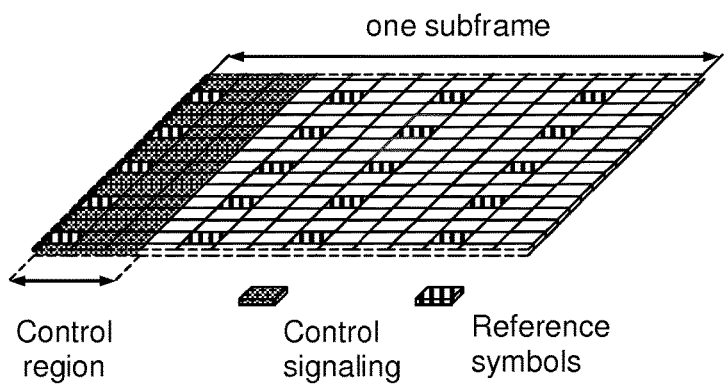

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator, CFI. The downlink subframe also contains common reference symbols, which are known to the receiver and used for coherent demodulation of e.g. the control information. A downlink system with CFI=3 OFDM symbols as control is illustrated in FIG. 2c. The reference symbols shown in FIG. 2c are the cell specific reference symbols, CRS, and are used to support multiple functions including fine time and frequency synchronization and channel estimation for certain transmission modes.

Figure 2D:
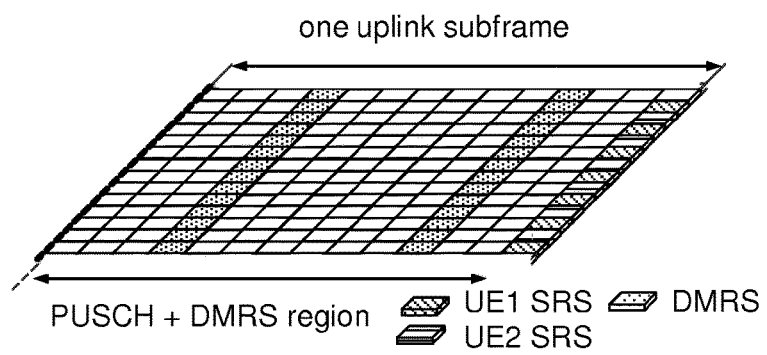

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals, DMRS, and sounding reference signals, SRS. DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 2d. UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are UE specific and are indicated by scrambling the DCI Cyclic Redundancy Check (CRC) with the UE-specific C-RNTI identifier. A unique C-RNTI is assigned by a cell to every UE associated with it, and can take values in the range 0001-FFF3 in hexadecimal format. A UE uses the same C-RNTI on all serving cells.

As previously described in the background section, Unlicensed bands offer the possibility for deployment of radio networks by non-traditional operators that do not have access to licensed spectrum, such as e.g. building owners, industrial site and municipalities who want to offer a service within the operation they control. Recently, the LTE standard has been evolved to operate in unlicensed bands for the sake of providing mobile broadband using unlicensed spectrum. The 3GPP based feature of License Assisted Access, LAA, was introduced in Rel. 13, supporting carrier aggregation between a primary carrier in licensed bands, and one or several secondary carriers in unlicensed bands. Further evolution of the LAA feature, which only supports DL traffic, was specified within the Rel. 14 feature of enhanced License Assisted Access, eLAA, which added the possibility to also schedule uplink traffic on the secondary carriers. In parallel to the work within 3GPP Rel. 14, work within the MulteFire Alliance, MFA, aimed to standardize a system that would allow the use of standalone primary carriers within unlicensed spectrum. The resulting MulteFire 1.0 standard supports both UL and DL traffic.

Turning to FIG. 3, exchange of load information for LTE mobility load balancing is illustrated. The concept of Mobility Load Balancing, MLB, aims to increase the overall capacity in a LTE network and achieve an evenly distributed load among the cells. The load balancing function transfers part of the traffic from congested cells by exchanging load information between eNBs, and subsequently triggering handover or adjusting handover and/or reselection configurations. In current 3GPP standard, the load information is exchanged by Resource Status Reporting procedures via X2 interface between the eNBs as illustrated in FIG. 3. The procedure is initiated with a Resource Status Request from the first eNB (eNB1) to request reporting from the second eNB (eNB2). Upon successful load measurement establishment, eNB2 responds with a Resource Status Response message to eNB1, and starts periodic load information reporting in Resource Status Update messages. The load information consists of Physical Resource Block, PRB, usage information, Transport Network Layer, TNL, load information, hardware load indication and composite available capacity etc.

However, the radio resource status in the load information exchanged between eNBs as illustrated in FIG. 3 consists of downlink and uplink PRB usage. This is based on characteristics of licensed spectrum where cells have continuous access to the frequency channel. The channel load is calculated by the downlink and uplink physical resources consumed by eNB and its served UEs respectively.

In unlicensed spectrum, the frequency channel may be shared by multiple communication systems that may operate with the same or different Radio Access Technologies, RATs. So the channel load for a cell includes not only the usage of the physical resources by itself and its served UEs, but also the occupancy from each neighboring node sharing the same frequency channel. Thus the current radio resource status report may be misleading for eNB1. For example, if eNB2's cell has a very low PRB usage but suffering strong interference from a neighboring WiFi network, then eNB2 would not be a good load balancing target.

The present disclosure presents a solution to the above problem in that new methods, arrangements and computer readable storage media for controlling radio channel deployment in the unlicensed spectrum are proposed. In particular, solutions for mobility and/or load balancing target selection when using un-licensed carriers are proposed that improve load balancing performance in the unlicensed spectrum and improve network robustness.

Figure 4A:
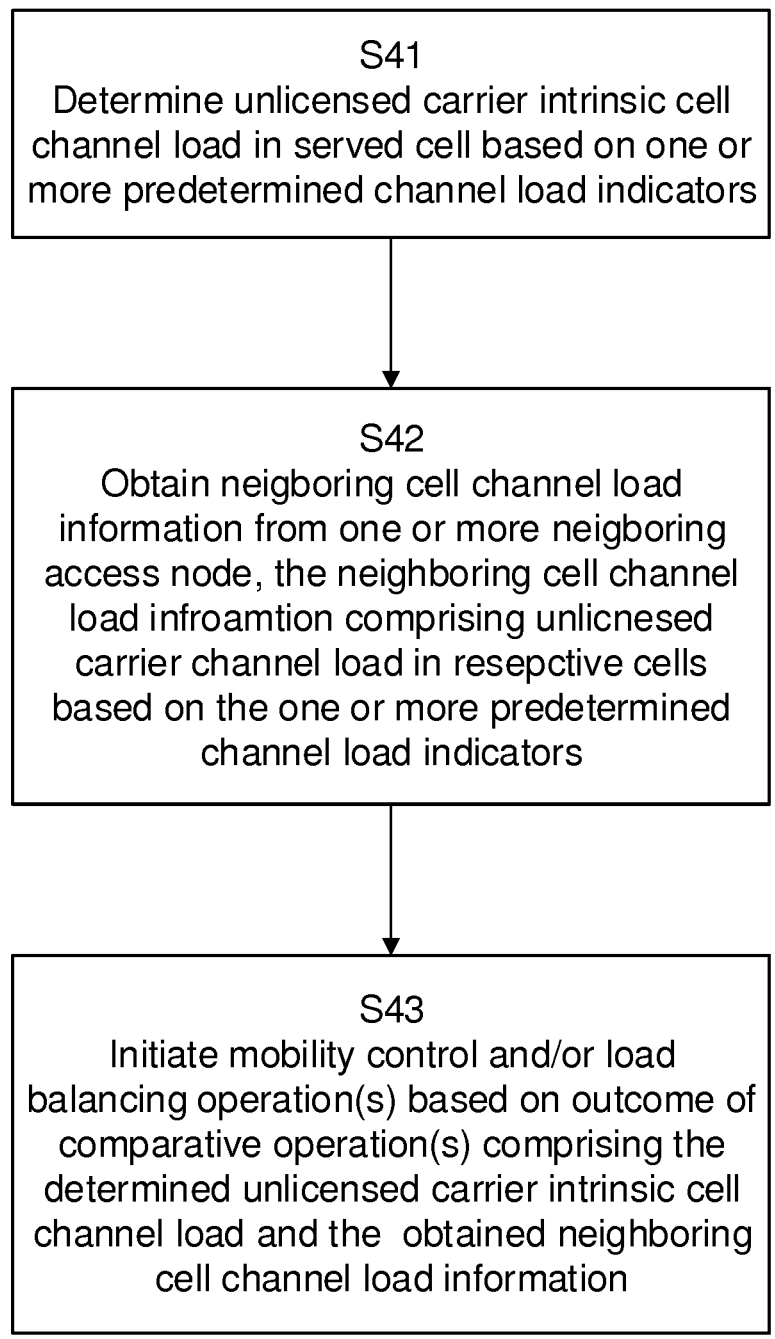

FIG. 4a is a flowchart illustrating embodiments of method steps performed in an access node for controlling radio channel deployment in an un-licensed spectrum.

Within the context of this disclosure, the terms "access node" encompass any radio base station which is able to communicate wirelessly with a wireless device in of a wireless network, as well as, with another access node, by transmitting and/or receiving wireless signals. Thus, the term "access node" is used to designate a node transmitting wireless signals to a receiving wireless device. In the context of the present disclosure, the access node is an eNodeB, an Access Point of a Wi-Fi or WiMAX network or any other type of network node configured for data transmissions in the unlicensed spectrum, e.g. a User Equipment controlling transmission in a Device to Device network in the unlicensed spectrum. Other examples of access nodes are NodeB, base station, multi-standard radio, radio node, eNodeB, gNodeB, network controller, radio network controller, base station controller, relay, donor node controlling relay, base transceiver station, access point, transmission points, transmission nodes, nodes in distributed antenna system, DAS etc.

In the context of the present disclosure, radio channel deployment primarily relates to payload transmission from the radio network node to a receiving wireless device, i.e., transmission of a data message from the radio network node performing the disclosed method steps.

In its most generic form, as illustrated in FIG. 4a, the method performed in the access node comprises to determine S41 unlicensed carrier intrinsic cell channel load in a cell served by the access node based on one or more predetermined channel load indicators, e.g., by measuring and estimating channel occupancy within the cell. In addition to the intrinsic cell measurements, the access node obtains S42 neighbor cell channel load information, from one or more neighboring access nodes, the neighbor cell channel load information comprising unlicensed carrier channel load in respective cells based on the one or more predetermined channel load indicators. Based on an outcome of one or more comparative operations comprising the determined unlicensed carrier intrinsic cell channel load and/or the obtained neighbor cell channel load, the method comprises to initiate S43 at least one channel deployment operation in the access node. As mentioned, the disclosed method improves radio channel deployment in the unlicensed spectrum and improving the network robustness.

According to embodiments, the channel deployment operation is a mobility control operation and/or a load balancing operation. Accordingly, the disclosed method provides mobility control and load balancing performance in the unlicensed spectrum.

According to another aspect of the disclosure, the channel deployment operation is a configuration of a secondary carrier; thereby providing for improved channel deployment and channel load considerations in a Licensed Assisted Access, LAA, scenario.

Figure 4B:
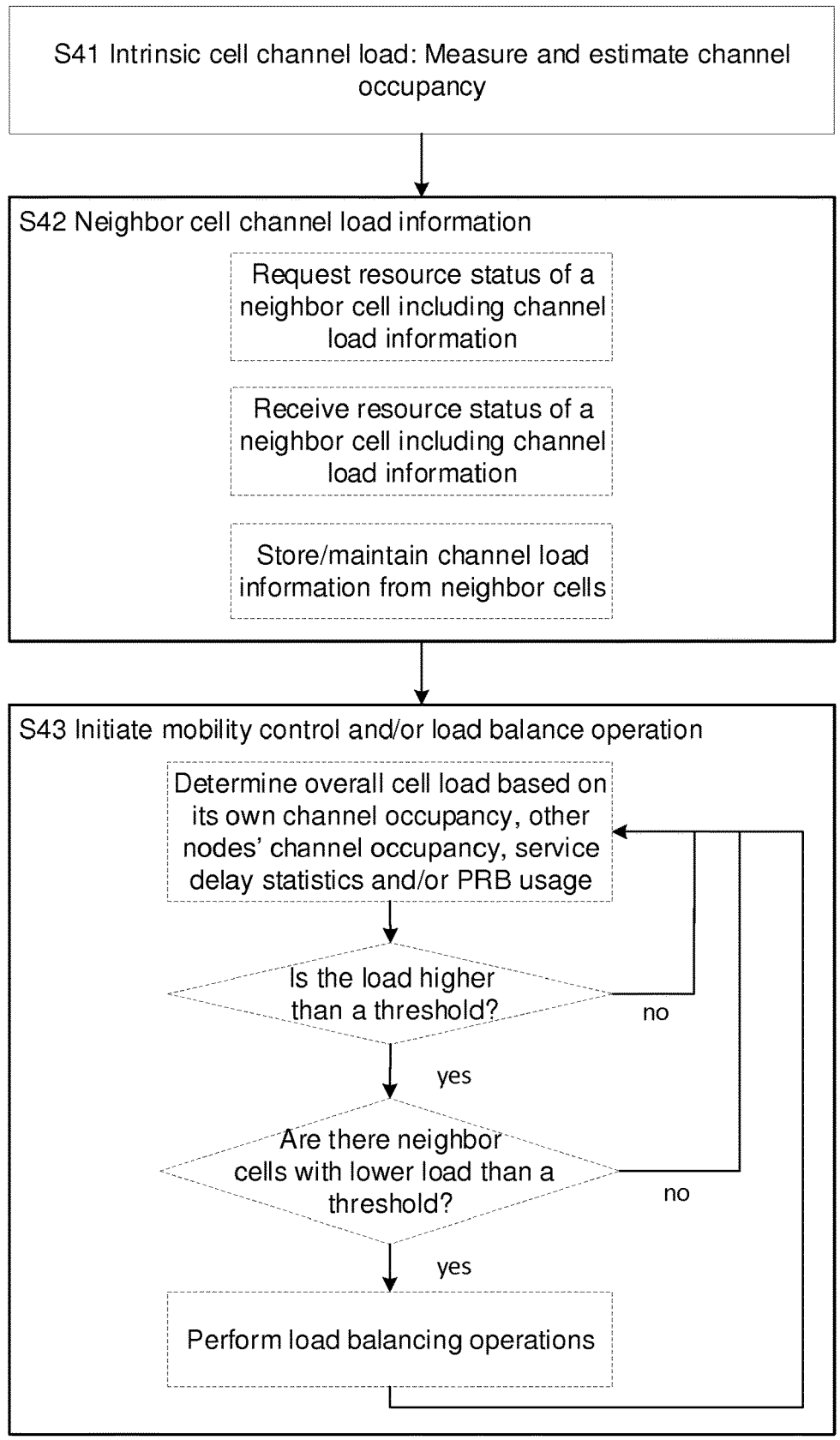

Turning to FIG. 4b, further optional and non-limiting details of the method performed in the access node is disclosed. The step of obtaining S42 neighbor cell channel load information from one or more neighboring access nodes, may optionally comprise the step of selecting one or more neighboring access nodes and to transmit, to the selected one or more neighboring access nodes, a request for neighbor cell channel load information. Thus, the access nodes request resource status of a neighboring cell including channel load information. The request is sent to the neighboring access node itself or to one or more other network nodes presumed to have access to such information, e.g., in terms of neighbour cell channel information for a plurality of access nodes. Neighbor cell channel load information, comprising unlicensed carrier channel load is determined based on the one or more predetermined channel load indicators, is received in the access node. Thus, the obtained neighbor channel load information may be retrieved from respective neighboring access node that each perform the step of determining their unlicensed carrier intrinsic cell channel load and shares this load information with the neighboring nodes so that the load values accessible within an access node will be fully comparable. The resource status of the neighbour cell including channel load information is received in the access node and may be stored or maintained in the access node as long as real-time reliability is maintained for the information.

Upon receiving the channel load information, the access node may maintain it from multiple neighboring nodes. If the access node's own load is high, it can select a suitable offloading target based on the channel load.

According to embodiments, the obtained neighbor cell channel load information is stored as a weighted average value or as a maximum value within a given time period. Accordingly, the comparative operation may be performed as a comparison between a weighted average value of the intrinsic cell channel load and weighted average values of corresponding load values from neighboring cells, wherein the weighted average values representing load in the neighboring cells may be calculated in the access node obtaining these values or received as weighted values in the obtained neighbor cell channel information.

According to embodiments, real-time reliability may be assured by time stamping the determined unlicensed carrier intrinsic cell channel load the neighbor cell channel load information and/or the obtained neighbor cell channel load information, i.e., associating a time stamp to the stored information. Such a time stamp may of course also be applied to a determined intrinsic cell channel load, when this is stored and maintained in the access node. Time stamping of the respective load values represents one solution for ensuring real-time reliability when using the values in a channel deployment operation.

The access node may measure and estimate the channel load information periodically or based on request. In one embodiment, the access node may share this information with neighboring access nodes. An example is to use the Radio Resource Request and Update procedures to exchange the channel load information between access nodes.

Thus, according to embodiments, a periodicity for obtaining the neighbor cell channel load information or a trigger to obtain the neighbor cell channel load information may be determined. As such, the obtaining of neighbor cell channel load information and optionally also the determining of the unlicensed carrier intrinsic cell channel load could be performed according to a predetermined periodicity, so that the access nodes has access to reliable load values and is capable of reassessing the channel deployment according to a given periodicity. According to another option, a measurement interval for specified one or more channel load indicators may be determined implying that there may be different need for periodic with regard to different channel load indicators.

As previously mentioned in connection with FIG. 4a, the access node then determines overall cell load based on an outcome of one or more comparative operations comprising the determined unlicensed carrier intrinsic cell channel load, i.e., on its own channel occupancy, and/or the obtained neighbour cell channel load information, i.e., another node's channel occupancy using channel load indicators. When the load is higher than a predetermined first threshold, the access node determines if there are neighboring access nodes experiencing a lower load than a threshold level, the first threshold or a selected second threshold. If that is the case, load balancing operations are performed from the serving access node to one or more neighboring access nodes.

According to embodiments, a number of channel load indicators may be considered and combined when performing the comparative operations, i.e., in order to initiate an appropriate channel deployment operation. Such channel load indicators comprise:

channel utilization of neighboring nodes
channel utilization of local cell, which includes the served wireless devices
Discovery Signal, DRS, outage rate, which can be the number of unsuccessful DRS transmission over a certain period
DRS contention delay, which can be an average DRS subframe offset within the DMTC, or the actual time offset when the channel is free within the DMTC.
Non-DRS contention delay, which can be LBT delay statistics of the user traffic.
DL and UL PR usage.

According to embodiments, the one or more channel load indicators comprise channel utilization within the intrinsic cell calculated as a ratio of actually used shared carriers versus maximum shared carriers available to the cell. The one or more channel load indicators may also comprise channel utilization from interfering transmissions calculated as a ratio of time where the measured received signal strength, RSS, outside downlink, DL, and uplink, UL, transmission opportunities within the cell exceeds a threshold.

According to another aspect of the disclosure, the one or more channel load indicators comprise a DRS contention delay. DRS is scheduled periodically with highest access priority and could be used for wireless device measurement and to maintain the connection. According to another aspect of the disclosure, the one or more channel load indicators comprise a non-DRS contention delay. The presence of non-DRS depends on the presence and type of user traffic. It could be further divided into sub classes for each contention category or priority class and can be used as complementary information. The one or more channel load indicators could also comprise a Discovery Signal, DRS, outage.

According to embodiments, channel load is determined based on a plurality of channel load indicators. Thus, according to this aspect of the disclosure, multiple channel load indicators are taken into account in order to arrive at a channel deployment that is optimized for a current network load. When considering such multiple channel load indicators, physical resource block, PRB, usage may be included as one channel load indicator. The one or more comparative operations may also be performed for respective channel load indicators.

Thus, according to one aspect the channel utilization from the cell itself, its served wireless devices and any neighboring nodes operating with the same or different RAT is considered. The channel utilization of the local cell can be measured by the accumulated transceiver operations where transmission may take place for the access node and its served wireless devices. It may also include wireless device autonomous transmissions outside a given transmission opportunity, TxOP. The channel utilization of neighboring nodes can be measured outside the TxOP when the RSSI of same frequency channel is higher than a certain threshold. The access node may request wireless device to measure and report the sensed channel utilization to make a decision jointly. Different nodes (access nodes and served wireless devices can perceive different utilization, depending to how closer interferers are located. The load reporting can be a weighted combination of all utilization values. However, since wireless devices often can be moved to less disturbed cells/carriers, the wireless device measurements are primarily input data for the access node, on which it bases handover decisions (and possibly dedicated priorities for steered re-selection).

In another embodiment, the channel load can be indicated by the signal transmission delay or service delay that is associated to contention of radio resources. A large delay could mean that the access node has more failures in accessing the channel.

An indicator may, e.g., be a statistics of cell broadcast service, e.g., Discovery Signal, DRS, transmissions. The access node can transmit DRS in subframe 0 within the Discovery Signal Measurement and Timing Configuration (DMTC) window if the channel is sensed free; otherwise it needs to postpone its DRS to the next subframes until the channel is sensed free. If the channel is not free during the DMTC window, it needs to postpone DRX transmission to the next DMTC cycles.

Another indicator can be statistics of non-DRS user data transmission delay. A sample can be defined as delay of DL LBT for a TxOP transmission from beginning of sensing channel till the successful transmitting of the signal. The non-DRS contention delay in a loaded system may be used as a complement to the DRS transmission statistics in light loaded system for making a decision jointly.

Due to regulatory requirements in the unlicensed spectrum, the maximum channel utilization is normally smaller than 100% in order to allow other nodes to access the channel. Thus an upper bound can be considered to determine a fully occupied channel.

In another embodiment, the DRS outage could be used as indication of the channel utilization. The reason is that DRS may be only transmitted within a specific DMTC window, hence the contention delay is always present; if the L T is not successful within DMTC window, the DRS will be dropped.

In another embodiment, the combination of the contention delay and other parameter above could be used as indication of the channel load. For example, if there are two nodes contending but one node has much lower traffic than the other, then this node may have low channel utilization but still a low contention delay. The node could also obtain higher channel utilization and capacity in case of higher traffic, but low channel utilization and a high contention delay could imply that the channel is saturated with too many nodes.

In another embodiment, PRB usage for an unlicensed cell may indicate only the usage within the cell's own channel utilization period, as compared to a licensed cell where the PRB usage is measured in continuous time periods. Thus a high PRB usage with low composite channel utilization could mean that an access node can contend for more capacity; while a low PRB usage with high composite channel utilization could mean that there is capacity headroom in the cell.

Some example scenarios of the channel load indicators and their use in the comparative operations are given below:

Case 1: Assuming a channel saturation threshold of 90%, if the sum of intrinsic and neighboring channel utilization is 10%+50%=60%, it could mean there is still 30% free capacity for the eNB to contend for.

The source eNB could compare the overall channel utilization (intrinsic+neighboring) with a certain threshold X % (for example 75%). if the overall channel utilization is lower than X %, there is enough free capacity on the channel and the eNB has no need to perform load balancing. If the overall channel utilization is higher than X %, the eNB can compare whether there a neighbor cell with lower overall channel utilization. If there is, the eNB may choose that neighbor cell as target cell and initiate load balancing operations for the UEs that also have good cell quality measurement on the target cell.

Case 2: Assuming the sum of intrinsic and neighboring channel utilization reaching 90% means the channel is saturated. If the intrinsic and neighboring utilization is 45% each, there may be only one neighboring node contending the channel with the source eNB.

But if the channel saturates but the intrinsic utilization is only 10% with a very high DRS outage ratio and contention delay, it could mean there are many neighboring nodes trying to access the channel.

Thus by comparing intrinsic, neighbor and overall channel utilization the eNB could estimate its ability to access the channel and determine load balancing operations (as described in case 1).

Case 3: The source eNB may suffer high DRS outage ratio that cause problem for its UEs to measure cell quality. The eNB could compare the DRS outage with a certain threshold Y % (for example 20%) and determine whether to perform load balancing operations (as described in case 1).

Furthermore, high DRS outage and contention delay could be also caused by neighbor cells using the same DMTC configuration. This may happen even when the overall channel utilization is low. The eNB may alternatively adjust its DMTC configuration to allow a larger DRS transmission window and/or more DRS occasions. Vice versa, if the DRS contention delay and outage is very low in an under-utilized channel, the eNB may choose to decrease the DRS transmission window and/or the DRS occasions.

Case 4: The non-DRS contention delay may contain one or more metrics for different Quality of Services (QoS) types of user data. The eNB could use this information to derive how well it may serve a certain type of user. Alternatively, the eNB could also use this information to estimate the channel contention situation outside the DMTC.

Case 5: The PRB usage could be used to indicate the free channel capacity in frequency domain. If the channel utilization is saturated, but the PRB usage is low, the eNB may still have free capacity to serve more user traffic. For example the free capacity can be calculated as:

(Channel saturation threshold−neighboring channel utilization−Intrinsic channel utilization ratio*PRB usage ratio).

If the source eNB suffers high channel load and decide to perform load balancing operations, but all its neighbor cells are also suffering high channel load. The source eNB may choose a neighbor cell with low PRB usage (or alternatively high free capacity) as target cell.

In the table below, a table of channel load indicators are presented. As indicated in the below represented table, the weighted average may be determined for a plurality of channel load indicators. However, the one or more comparative operations may also be performed for each respective channel load indicators.

TABLE 1

| Channel utilization local cell | Low | Low | Medium | High | Medium | Medium |
|---|---|---|---|---|---|---|
| Channel utilization neighbor nodes | Low | High | Medium | Low | Medium | Medium |
| DRS outage rate | Low | Low | High | any | Medium | Medium |
| Contention delay | Low | Low | High | any | Medium | Medium |
| PRB usage | any | High | any | High | Low | High |
| Overall channel load decision | Low | Low | High | High | Medium | High |

The performing of load balancing operations may comprise that the access node use the load balancing information for mobility decisions. The load balancing information is in part received through measurement reports from connected wireless devices stating that there is a neighbour cell that is better (higher RSRP, RSRQ, SINR) and it also includes other neighbour cell in its report. The access node then evaluates the neighbour cells in the measurement report together with the load condition. This can for example be that if a set of neighbour cells has RSRP/RSRQ/SINR values that differ less than a threshold (i.e., the cells signal quality measured by the UE are almost the same) the access node will rank the cell within the set according to load (lowest load first) and attempt to handover the wireless device to the cell with the lowest load within the set.

As previously indicated a weighted average representing the intrinsic cell channel load and corresponding channel load comprised in the obtained information may be stored within the access node. A weighted average may also be used in the one or more comparative operations that are performed prior to initiating one or more channel deployment operations.

According to embodiments, the one or more comparative operations comprise a comparison between determined intrinsic cell channel load and neighbor cell channel load information for the respective channel load indicator or the weighted average of channel load indicators.

As indicated in FIG. 4b, the one or more comparative operations may comprise the performing of a first comparison of determined intrinsic cell channel load to one or more threshold values, wherein the one or more threshold values represent the respective channel load indicators or the weighted average of the channel load indicators; and a second comparison of the neighbor cell channel load information to one or more threshold values, wherein the threshold values in the first and second comparison may be the same or different threshold values. Threshold related rules may also be used in the comparative operations, implying that if channel load according to one selected channel load indicators is within a predetermined range, a channel deployment operation may be initiated if other channel load indicators have values above or below a given threshold value.

The access node can also use the load information when configuring measurement events for the wireless device. The measurement report configuration typically contains cell specific offsets. These offsets can be set to penalize cells with high load so that the signal quality (RSRP, RSRQ, SINR) needs to be higher for a cell with high load to trigger a measurement report compared to cells with low load.

In another embodiment, the access node may share the channel load information with wireless devices. It may contain the local cell's channel load information, or the neighbour nodes channel load information, or both. The access node may signal the channel load information in broadcast messages, or in unicast message only to its served wireless devices. If channel load information is broadcasted, the wireless device doesn't need to be in connected state to the access node, thus it may acquire this information by measuring and reading system information from neighboring cells or discovered cells. However, there may for example be security concerns for the access node not to broadcast channel load information. The wireless device can also acquire channel information in unicast message after connected to the access node. This information can be used also after the wireless device switches to idle mode.

Thus, the access node may transmit intrinsic cell channel load on the unlicensed carrier to a receiving wireless device and may include load information for relevant neighbours, transmitting neighbor cell channel load information on the unlicensed carrier. When then the signalling can be conveyed as Broadcast or UE-dedicated signalling, the access node/'current serving cell' only includes its own load information, when the info has to come via Broadcast (meaning wireless device has to read broadcast from several candidate cells—more wireless device activity and battery drain). According to one embodiment, the eNB transmits only the intrinsic cell channel load information. This can be due to the channel load information cannot be shared between eNBs, or due to there is no connection between the eNBs. In this case UE needs to obtain neighbour cell channel load information by receiving system information of that cell.

In another embodiment, the eNB transmits one or more neighbor cell channel load information. In this case UE may obtain the neighbor cell channel load information associated to one or more of its neighbor cells from the serving cell. The wireless device may use this information to optimize cell selection or mobility target selection, e.g., cells with lower load may have higher probability with better data throughput and lower data traffic delay.

According to the above description, the perceived unlicensed frequency channel load may need to be exchanged between the access node and its neighboring nodes, in addition to the radio resource status that contains PRB usage.

The wireless device may also use the channel load information to determine cell quality measurement parameters, e.g., for high load cells the wireless device may need to collect samples over a longer period.

Turning back to the step of initiating S43 at least one channel deployment operation Based on an outcome of one or more comparative operations the initiating may comprise to select one or more neighboring access nodes for the channel deployment operation; and initiate handover of at least one wireless device connection to the selected neighboring access node or to initiate connection release of at least one wireless device and redirect to the selected neighboring access node. The initiating of the initiating of at least one channel deployment operation may further comprise to adjust measurement configurations associated with the one or more neighboring access nodes or to adjust cell reselection configurations.

Turning to FIG. 5 a flowchart illustrating embodiments of method steps performed in a network node for controlling radio channel deployment in an un-licensed spectrum is disclosed. In the context of the present disclosure, the network node is an eNodeB, an Access Point of a Wi-Fi or WiMAX network or any other type of network node configured for data transmissions or control of data transmission in the unlicensed spectrum, e.g. a User Equipment controlling transmission in a Device to Device network in the unlicensed spectrum. The method comprises to receive S51, from an access node, a request to determine unlicensed carrier channel load based on one or more channel load indicators; to determine S52 unlicensed carrier channel load in a cell served by the network node based on the one or more channel load indicators; and to send S53 information comprising the determined unlicensed carrier channel load to the requesting access node. According to embodiments, the network node is an access node having a neighbor relationship to the requesting access node.

Turning to FIG. 6, a flowchart illustrating embodiments of method steps performed in a wireless device for controlling radio channel deployment in an un-licensed spectrum is disclosed. In the context of the present disclosure, a "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or Global Positioning System, GPS, receiver; a Personal Communications System, PCS, user equipment that according to embodiments combine a cellular radiotelephone with data processing; a Personal Digital Assistant, PDA, that can include a radiotelephone or wireless communication system; a laptop; a camera (e.g., video and/or still image camera) having communication ability; and any other computation or communication device capable of wireless communication with an access node over the unlicensed spectrum.

In its most generic form, the method performed in a wireless device comprises to receive S61 an intrinsic cell channel load determined for an unlicensed carrier in a cell served by a serving access node; wherein the intrinsic cell channel load is determined based on one or more predetermined channel load indicators and to receive S62 neighbor cell channel load information comprising unlicensed carrier channel load in respective neighbor cells to the cell served by the serving access node. The unlicensed carrier channel load is determined based on the one or more predetermined channel load indicator and a mobility target based is selected S63 based on received intrinsic channel load and neighbor cell channel load information.

According to embodiments, the wireless device could select one or more neighboring cells in which to perform channel quality measurement based on the received channel load information; and determine channel quality parameters based on the channel quality measurements. The wireless device may also be configured to transmit a measurement report, e.g., RSRP/RSRQ/SINR, comprising the determined channel quality parameters to a receiving access node. The wireless device may also select which cells to measure and/or increase the time window to collect more samples to have a more reliable measurement.

FIG. 7 is an example node configuration of an access node, which may incorporate some of the example embodiments discussed above. The access node is configured for controlling radio channel deployment in an un-licensed spectrum. As shown in FIG. 7, the radio network node 70 comprises radio circuitry 71 arranged to transmit and receive radio signals from one or more wireless device. It should be appreciated that the radio circuitry 71 may be comprised as any number of transceiving, receiving, and/or transmitting units or circuitry and that the radio circuitry may operate in half-duplex or full duplex transmission mode. It should further be appreciated that the radio circuitry 71 may be in the form of any input/output communications port known in the art.

The radio network node may further comprise communications circuitry 72 arranged to transmit and/or receive communications signals from one or more further radio network nodes. It should further be appreciated that the communications circuitry 72 may be in the form of any input/output communications port known in the art. For example during operations in the above discussed framework, the communications circuitry 72 may be used to for the exchange of neighbor cell channel load information.

Processing circuitry 73 is arranged to control operation of the radio network node. In particular, the processing circuitry 73 controls radio channel deployment in the unlicensed spectrum. The processing circuitry 73 is arranged for determining unlicensed carrier intrinsic cell channel load in a cell served by the access node based on one or more predetermined channel load indicators and obtaining neighbor cell channel load information, from one or more neighboring access nodes, the neighbor cell channel load information comprising unlicensed carrier channel load in respective cells based on the one or more predetermined channel load indicators. The processing circuitry 73 is further arranged initiating at least one channel deployment operation based on an outcome of one or more comparative operations comprising the determined unlicensed carrier intrinsic cell channel load and/or the obtained neighbor cell channel load information.

Figure 7A:
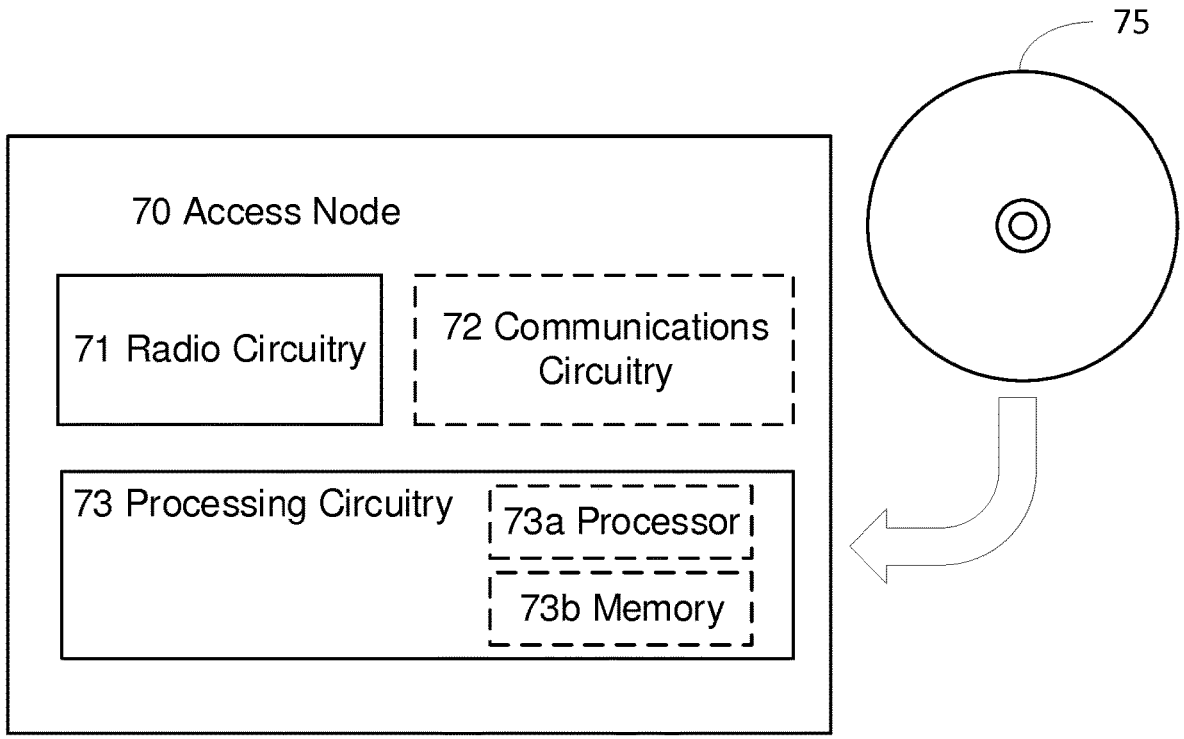

FIG. 7a also illustrates an example computer program product 75 comprising a computer readable storage medium, such as a universal serial bus (USB) memory, a plug-in card, an embedded drive or a read only memory (ROM). The computer readable medium has stored thereon a computer program comprising program instructions for execution in the processing circuitry 73.

According to an aspect of the disclosure, the processing circuitry comprises a processor 73a and a memory 73b. The processor 73a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry. The memory 73b may be configured to store the obtained neighbor cell channel load information as well as the determined unlicensed carrier intrinsic cell channel load and/or executable program instructions. The memory 73b may be any suitable type of computer readable memory and may be of volatile and/or non-volatile type.

Figure 7B:
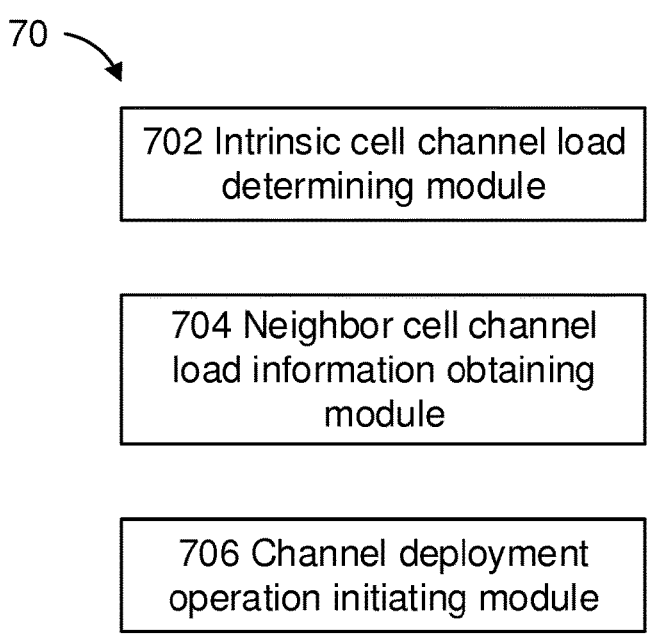

FIG. 7b illustrates an embodiment of a radio network node 70 configured for controlling radio channel deployment in an un-licensed spectrum. The radio network node 70 comprises an intrinsic cell channel load determining module 702, a neighbor cell channel load information obtaining module 703 and a channel deployment operation initiating module 706.

FIG. 8 discloses an embodiment of a network node 80 configured for controlling radio channel deployment in an unlicensed spectrum, the network node comprising communications circuitry 82 arranged for network node communication; and processing circuitry 8) arranged for receiving, by means of the communications circuitry, a request from an access node to determine unlicensed carrier channel load based on one or more channel load indicators; determining unlicensed carrier channel load in a cell served by the network node based on the one or more channel load indicators; and sending information comprising the determined unlicensed carrier channel load to the requesting access node.

According to an aspect of the disclosure, the processing circuitry comprises a processor 83*a* and a memory 83*b*. The processor 83*a* may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry. The memory 83*b* may be configured to store the neighbor cell channel load information as well as the intrinsic cell channel load and/or executable program instructions. The memory 83*b* may be any suitable type of computer readable memory and may be of volatile and/or non-volatile type.

FIG. 8 also illustrates an example computer program product 85 comprising a computer readable storage medium, such as a universal serial bus (USB) memory, a plug-in card, an embedded drive or a read only memory (ROM). The computer readable medium has stored thereon a computer program comprising program instructions for execution in the processing circuitry 83.

FIG. 9 discloses a wireless device configured for controlling radio channel deployment in an unlicensed spectrum, the wireless device comprising radio circuitry 91 arranged for wireless device communication and processing circuitry 93 arranged for receiving an intrinsic cell channel load determined for an unlicensed carrier in a cell served by a serving access node; wherein the intrinsic cell channel load is determined based on one or more predetermined channel load indicators. The processing circuitry is further configured to receiving neighbor cell channel load information, by means of the radio circuitry; the neighbor cell channel load information comprising unlicensed carrier channel load in respective neighbor cells to the cell served by the serving access node. The unlicensed carrier channel load is determined based on the one or more predetermined channel load indicators. The processing circuitry is further configured to select a mobility target based on based on received intrinsic channel load and neighbor cell channel load information.

FIG. 9 also illustrates an example computer program product 95 comprising a computer readable storage medium, such as a universal serial bus (USB) memory, a plug-in card, an embedded drive or a read only memory (ROM). The computer readable medium has stored thereon a computer program comprising program instructions for execution in the processing circuitry 93.

In the drawings and specification, there have been disclosed exemplary embodiments. However, many variations and modifications can be made to these embodiments without substantially departing from the principles of the present disclosure. Thus, the disclosure should be regarded as illustrative rather than restrictive, and not as being limited to the particular embodiments discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other RATs, including LTE-advanced and the 5th generation mobile communication standard, may also benefit from the example embodiments disclosed herein when operating in the un-licensed spectrum.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, performed in an access node, for controlling radio channel deployment in an un-licensed spectrum, the method comprising:
   determining unlicensed carrier intrinsic cell channel load for an unlicensed carrier in a cell served by the access node based on one or more predetermined channel load indicators;
   obtaining neighbor cell channel load information from one or more neighboring access nodes, the neighbor cell channel load information comprising unlicensed carrier channel load in respective neighbor cells to the cell served by the access node based on the one or more predetermined channel load indicators;
   initiating at least one channel deployment operation based on an outcome of one or more comparative operations comprising the determined unlicensed carrier intrinsic cell channel load and/or the obtained neighbor cell channel load information;
   transmitting, from the access node, the intrinsic cell channel load on the unlicensed carrier; and
   transmitting, from the access node, the neighbor cell channel load information on the unlicensed carrier.

2. The method of claim 1, wherein the channel deployment operation is one or both of a mobility control operation and a load balancing operation.

3. The method of claim 1, wherein the channel deployment operation is a configuration of a secondary carrier.

4. The method of claim 1, wherein the step of obtaining comprises:
   selecting one or more neighboring access nodes;
   transmitting, to the selected one or more neighboring access nodes, a request for neighbor cell channel load information; and
   receiving neighbor cell channel load information comprising unlicensed carrier channel load based on the one or more predetermined channel load indicators.

5. The method of claim 1, further comprising storing the obtained neighbor cell channel load information.

6. The method of claim 5, wherein the obtained neighbor cell channel load information is stored as a weighted average value or as a maximum value within a given time period.

7. The method of claim 1, further comprising time stamping one or both of the determined unlicensed carrier intrinsic cell channel load and the obtained neighbor cell channel load information.

8. The method of claim 1, further comprising determining a periodicity for obtaining the neighbor cell channel load information or a trigger to obtain the neighbor cell channel load information.

9. The method of claim 1, further comprising the determining of a measurement interval for specified one or more channel load indicators.

10. The method of claim 1, wherein the one or more channel load indicators comprise channel utilization within the intrinsic cell calculated as a ratio of actually used shared carriers versus maximum shared carriers available to the cell.

11. The method of claim 1, wherein the one or more channel load indicators comprise channel utilization from interfering transmissions calculated as a ratio of time where the measured received signal strength, RSS, outside downlink, DL, and uplink, UL, transmission opportunities within the cell exceeds a threshold.

12. The method of claim 1, wherein the one or more channel load indicators comprise at least one of a Discovery Signal, DRS, contention delay, a non-DRS contention delay, a DRS outage, and a Physical Resource Block, PRB, usage.

13. The method of claim 1, wherein the one or more comparative operations are performed for respective channel load indicators.

14. The method of claim 13, wherein the one or more comparative operations comprise a comparison of determined intrinsic cell channel load and neighbor cell channel load information for the respective channel load indicator or the weighted average of channel load indicators.

15. The method of claim 13, wherein the one or more comparative operations comprise performing a first comparison of determined intrinsic cell channel load to one or more threshold values, wherein the one or more threshold values represent the respective channel load indicators or the weighted average of the channel load indicators; and a second comparison of the neighbor cell channel load information to the one or more threshold values.

16. The method of claim 15 further comprising determining the one or more threshold values based on a set of threshold related rules.

17. The method of claim 1, wherein the one or more comparative operations are performed for a weighted average of channel load indicators.

18. The method of claim 1, wherein the initiating of at least one channel deployment operation comprises:
selecting one or more neighboring access nodes for the channel deployment operation; and
initiating handover of at least one wireless device connection to the selected neighboring access node.

19. The method of claim 1, wherein the initiating of at least one channel deployment operation comprises:
selecting one or more neighboring access nodes for the channel deployment operation; and
initiating connection release of at least one wireless device and redirect to the selected neighboring access node.

20. The method of claim 1, wherein the initiating of at least one channel deployment operation further comprises at least one of:
adjusting measurement configurations associated with the one or more neighboring access nodes; and
adjusting cell reselection configurations.

21. The method of claim 1, further comprising adjusting a DMTC configuration based on channel load information.

22. The method of claim 1, further comprising:
receiving one or more channel quality measurement reports from respective wireless devices; and
performing one or more comparative operations in response to receipt of the received one or more channel quality measurement reports using the stored neighbor cell channel load information.

23. A non-transitory computer readable storage medium, having stored thereon a computer program which, when executed in an access node, causes the access node to execute a method for controlling radio channel deployment in an un- licensed spectrum, the method comprising:
determining unlicensed carrier intrinsic cell channel load for an unlicensed carrier in a cell served by the access node based on one or more predetermined channel load indicators;
obtaining neighbor cell channel load information from one or more neighboring access nodes, the neighbor cell channel load information comprising unlicensed carrier channel load in respective neighbor cells to the cell served by the access node based on the one or more predetermined channel load indicators;
initiating at least one channel deployment operation based on an outcome of one or more comparative operations comprising the determined unlicensed carrier intrinsic cell channel load and/or the obtained neighbor cell channel load information;
transmitting, from the access node, the intrinsic cell channel load on the unlicensed carrier; and
transmitting, from the access node, the neighbor cell channel load information on the unlicensed carrier.

24. An access node configured for controlling radio channel deployment in an unlicensed spectrum, the access node comprising:
radio circuitry arranged for wireless device communication;
communications circuitry arranged for network node communication; and
processing circuitry arranged for:
determining unlicensed carrier intrinsic cell channel load for an unlicensed carrier in a cell served by the access node based on one or more predetermined channel load indicators;
obtaining neighbor cell channel load information from one or more neighboring access nodes, the neighbor cell channel load information comprising unlicensed carrier channel load in respective neighbor cells to the cell served by the access node based on the one or more predetermined channel load indicators;
initiating at least one channel deployment operation based on an outcome of one or more comparative operations comprising the determined unlicensed carrier intrinsic cell channel load and/or the obtained neighbor cell channel load information;
transmitting, from the access node, the intrinsic cell channel load on the unlicensed carrier; and
transmitting, from the access node, the neighbor cell channel load information on the unlicensed carrier.

25. A method performed in a network node, the method comprising:
receiving, from an access node, a request to determine unlicensed carrier channel load based on one or more channel load indicators;

determining unlicensed carrier channel load in a cell served by the network node based on the one or more channel load indicators;
sending information comprising the determined unlicensed carrier channel load to the requesting access node;
transmitting, from the network node, intrinsic cell channel load on an unlicensed carrier; and
transmitting, from the network node, neighbor cell channel load information on the unlicensed carrier, wherein the neighbor cell channel load information comprises unlicensed carrier channel load in respective neighbor cells to a cell served by the network node.

26. The method of claim 25, wherein the network node is an access node having a neighbor relationship to the requesting access node.

27. A non-transitory computer readable storage medium, having stored thereon a computer program which, when executed in a network node, causes the network node to execute a method comprising:
receiving, from an access node, a request to determine unlicensed carrier channel load based on one or more channel load indicators;
determining unlicensed carrier channel load in a cell served by the network node based on the one or more channel load indicators;
sending information comprising the determined unlicensed carrier channel load to the requesting access node;
transmitting, from the network node, intrinsic cell channel load on an unlicensed carrier; and
transmitting, from the network node, neighbor cell channel load information on the unlicensed carrier, wherein the neighbor cell channel load information comprises unlicensed carrier channel load in respective neighbor cells to a cell served by the network node.

28. A network node configured for controlling radio channel deployment in an unlicensed spectrum, the network node comprising:
communications circuitry arranged for network node communication; and
processing circuitry arranged for:
receiving, from an access node, a request to determine unlicensed carrier channel load based on one or more channel load indicators;
determining unlicensed carrier channel load in a cell served by the network node based on the one or more channel load indicators;
sending information comprising the determined unlicensed carrier channel load to the requesting access node;
transmitting, from the network node, intrinsic cell channel load on an unlicensed carrier; and
transmitting, from the network node, neighbor cell channel load information on the unlicensed carrier, wherein the neighbor cell channel load information comprises unlicensed carrier channel load in respective neighbor cells to a cell served by the network node.

29. A method performed in a wireless device, the method comprising:
receiving, from a serving access node, an intrinsic cell channel load determined for an unlicensed carrier in a cell served by the serving access node, wherein the intrinsic cell channel load is determined based on one or more predetermined channel load indicators;
receiving, from the serving access node, neighbor cell channel load information comprising unlicensed carrier channel load in respective neighbor cells to the cell served by the serving access node, wherein the unlicensed carrier channel load is determined based on the one or more predetermined channel load indicators; and
selecting a mobility target based on based on received intrinsic channel load and neighbor cell channel load information.

30. The method of claim 29, further comprising:
selecting one or more neighboring cells in which to perform channel quality measurement based on the received channel load information; and
determining channel quality parameters based on the channel quality measurements.

31. The method of claim 30, further comprising:
transmitting a measurement report comprising the determined channel quality parameters to a receiving access node.

32. A non-transitory computer readable storage medium, having stored thereon a computer program which, when executed in a wireless device, causes the wireless device to execute a method comprising:
receiving, from a serving access node, an intrinsic cell channel load determined for an unlicensed carrier in a cell served by the serving access node, wherein the intrinsic cell channel load is determined based on one or more predetermined channel load indicators;
receiving, from the serving access node, neighbor cell channel load information comprising unlicensed carrier channel load in respective neighbor cells to the cell served by the serving access node, wherein the unlicensed carrier channel load is determined based on the one or more predetermined channel load indicators; and
selecting a mobility target based on based on received intrinsic channel load and neighbor cell channel load information.

33. A wireless device configured for controlling radio channel deployment in an unlicensed spectrum, the wireless device comprising:
radio circuitry arranged for wireless device communication; and
processing circuitry arranged for:
receiving, from a serving access node, an intrinsic cell channel load determined for an unlicensed carrier in a cell served by the serving access node, wherein the intrinsic cell channel load is determined based on one or more predetermined channel load indicators;
receiving, from the serving access node, neighbor cell channel load information comprising unlicensed carrier channel load in respective neighbor cells to the cell served by the serving access node, wherein the unlicensed carrier channel load is determined based on the one or more predetermined channel load indicators; and
selecting a mobility target based on based on received intrinsic channel load and neighbor cell channel load information.

* * * * *